(12) United States Patent
Gould et al.

(10) Patent No.: US 6,281,467 B1
(45) Date of Patent: Aug. 28, 2001

(54) CONDUCTIVE HEAT RESISTANCE SEAM WELDING

(75) Inventors: Jerry E. Gould; Lawrence R. Lehman, both of Columbus; David P. Workman, Dublin, all of OH (US)

(73) Assignee: Edison Welding Institute, Columbus, OH (US)

( * ) Notice: Subject to any disclaimer, the term of this patent is extended or adjusted under 35 U.S.C. 154(b) by 0 days.

(21) Appl. No.: 09/508,708

(22) PCT Filed: Sep. 15, 1998

(86) PCT No.: PCT/US98/19077

§ 371 Date: Mar. 14, 2000

§ 102(e) Date: Mar. 14, 2000

(87) PCT Pub. No.: WO99/14008

PCT Pub. Date: Mar. 25, 1999

Related U.S. Application Data
(60) Provisional application No. 60/059,058, filed on Sep. 16, 1997.

(51) Int. Cl.[7] ............ B23K 11/06; B23K 11/30; B23K 11/36

(52) U.S. Cl. ............ 219/118; 219/119; 219/82; 219/83

(58) Field of Search .............. 219/117.1, 118, 219/119, 81, 82, 83, 91.2, 136, 137 R, 6.9

(56) References Cited

U.S. PATENT DOCUMENTS

| | | |
|---|---|---|
| 1,052,490 * | 2/1913 | Linden et al. . |
| 1,176,614 * | 3/1916 | Stanley . |
| 1,225,373 * | 5/1917 | Thomson . |
| 1,308,781 | 7/1919 | Gravell . |
| 1,568,080 * | 1/1926 | Meadowcroft . |
| 1,618,764 * | 2/1927 | Lunn . |
| 1,659,920 * | 2/1928 | Murray, Jr. . |
| 1,664,030 * | 3/1928 | Gravell . |
| 1,880,095 * | 9/1932 | Ledwinka . |
| 2,599,045 * | 6/1952 | Brolaski . |
| 2,620,424 * | 12/1952 | Otto . |
| 2,790,891 * | 4/1957 | Welsh . |
| 2,914,641 * | 10/1959 | Yuhasz . |
| 3,015,713 | 1/1962 | Eckler et al. . |
| 3,374,530 * | 3/1968 | Flanders et al. . |

FOREIGN PATENT DOCUMENTS

| | | |
|---|---|---|
| 47-48780 B | 8/1972 | (JP) . |
| 58-81577 A | 5/1983 | (JP) . |

* cited by examiner

*Primary Examiner*—Tom Dunn
*Assistant Examiner*—Colleen P. Cooke
(74) *Attorney, Agent, or Firm*—Philip J. Pollick

(57) ABSTRACT

A welding arrangement (10) consists of first and second parts to be welded (4a, 4b) with a portion of the first part and a portion of the second part juxtaposed to form a weld zone (8a, 8b). An electrically-conductive sheet (2) with a higher melting temperature than a melting temperature of the first part (4a) and a melting temperature of the second part (4b) is placed over the weld zone (8a, 8b). A first electrode (12) is placed in contact with the electrically conductive sheet material (2) and a second electrode (14) is positioned and aligned with the first electrode (12) to heat conducively the weld zone (8a, 8b) with an electrical current. For the butt weld configuration (10), a second electrically conductive sheet (6) is placed between the second electrode (14) and the weld zone (8a, 8b).

11 Claims, 4 Drawing Sheets

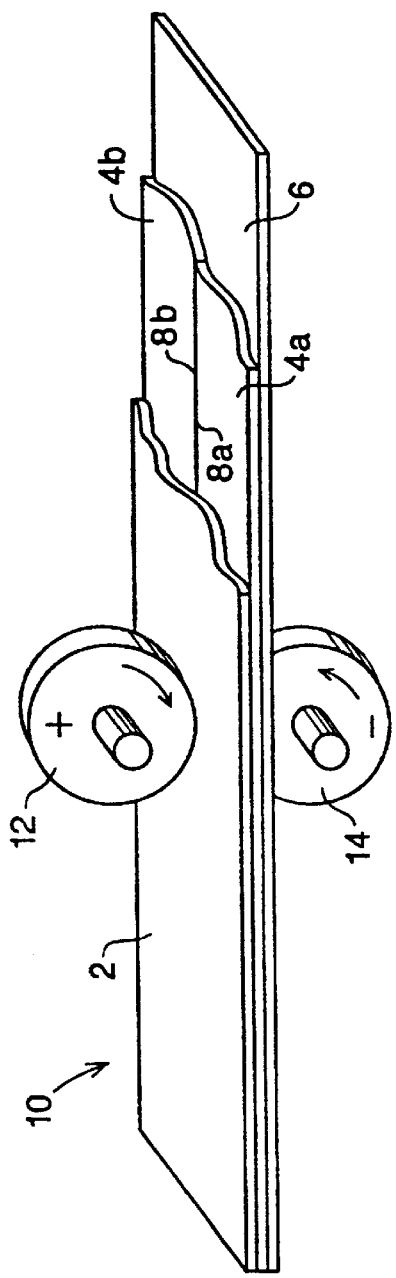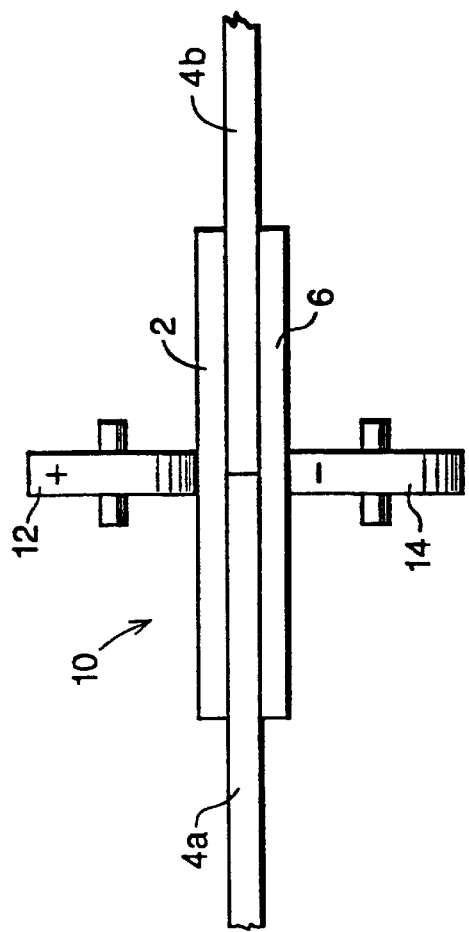

CONDUCTIVE HEAT RESISTANCE SEAM WELDING

CROSS REFERENCE TO RELATED APPLICATION

This application claims the benefit of U.S. Provisional Application 60/059,058 filed on Sep. 16, 1997 all of which is incorporated by reference as if completely written herein.

BACKGROUND OF THE INVENTION

1. Field

This invention pertains to a welding arrangement and process for joining parts in various weld configurations. More particularly, the process relates to the use of a resistively heated cover sheet that provides conductive heating of the weld zone of the parts to be welded and constrains the molten part material to the weld area.

2. Background

As consumer demand for more fuel efficient vehicles increases, as well as increased government regulation of fleet fuel economy, the use of light-weight materials such as aluminum for automotive components is becoming more attractive. As part of this effort, aluminum parts with continuous joints are of interest; however, the processes used to fabricate these joints are expensive. These processes include laser welding, gas tungsten arc (GTA) welding, and electron beam welding.

Thus it is an object of the present invention to provide an inexpensive continuous wed.

It is an object of the present invention to provide conductive heating of a weld zone.

It is an object of the present invention to prevent metal expulsion from the weld.

It is an object of the present invention to provide an improved method of welding aluminum.

It is an object of the present invention to provide a weld of good weld integrity.

It is an object of the present invention to reduce electrode wear rates.

It is a further object of the present invention to provide a weld with minimal evidence of cracking or porosity.

SUMMARY OF THE INVENTION

To meet these objects, the present invention features placing two electrically-conducting parts to be joined, typically metals although electrically conductive plastics may also be used, juxtaposed one to the next to form a weld zone. One or more covering sheets of a higher-melting, electrically-conductive material than the parts to be joined is placed next to the weld zone. Oppositely charged electrodes are positioned and aligned to cause a current to flow through the covering sheet and the weld zone of the materials to be joined. Resistance heating of the cover sheets) with subsequent conductive heating of the weld zone produces sufficient heat to melt and weld the parts together. The covering sheet(s) not only provides conduction heating of the weld zone but it also provides constraint to the molten metal to prevent expulsion of molten part materials from the weld pool.

In a common arrangement used with the present invention, the weld zone of the parts to be joined is sandwiched between two covering sheets with oppositely charged electrodes then placed in contact with the covering sheets. By using rotating circular electrodes, the parts can be joined in a continuous seam weld. However, it is to be realized that the method may also be used for intermittent and spot welds using appropriate electrode configurations.

A wide variety of materials can be joined including aluminum, lead, copper, brass and other alloys provided the materials to be joined melt are at a lower temperature than the covering material. The cover sheet typically is a steel such as SAE 1010/1008 but can include various other covering materials including cobalt, nickel, and titanium based alloys that melt at a temperature greater than the parts to be joined. Various weld-zone configurations may also be used including butt, tee, lap and mash configurations.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

BRIEF DESCRIPTION OF THE DRAWINGS

FIG. 1. is a perspective view, partially broken away, showing a butt weld arrangement of parts to be joined, their upper and lower covering sheets, and rotating circular electrodes as used in the present invention.

FIG. 2. is a front elevation view of the present invention showing the parts to be joined, the covering layers, and the circular rotating wheel electrodes.

Figure 3A:
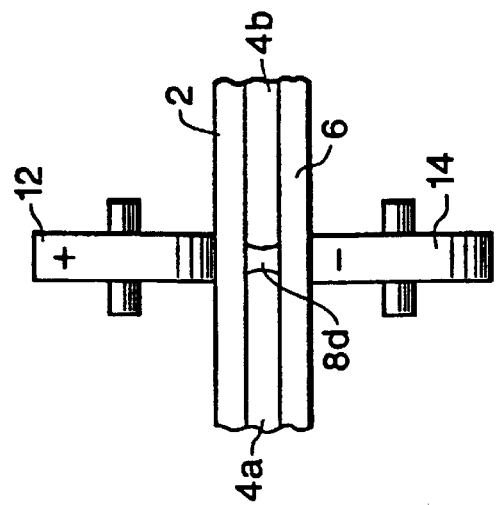
FIGS. 3a–c are partial schematic views of the present invention showing the stages of the welding process with FIG. 3a illustrating the initial resistive heating of the covering sheets with heat conduction to the weld zone of the parts to be joined, FIG. 3b showing the formation of a molten pool of the part material to be joined enclosed in a die composed of the covering sheets and the solid portion of the parts to be joined, and FIG. 3c illustrating the solidified weld (cast-type structure).

In describing the preferred embodiment of the invention which is illustrated in the drawings, specific terminology is resorted to for the sake of clarity. However, it is not intended that the invention be limited to the specific terms and materials so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

As shown in FIGS. 1–3c, the present invention is a process for joining materials (parts) 4a and 4b such as those made from automotive-gauge (0.040 in. (1.0 mm) and 0.080-in. (2.0 mm) ) aluminum alloys. Resistance heating of one or more cover sheets 2, 6, e.g., steel, with a higher melting temperature than the parts 4a, 4c to be joined, e.g., aluminum, with subsequent conductive heating of the parts 4a, 4b in a weld zone, is utilized to join parts 4a, 4b in a butt weld or similar configuration.

A schematic of a typical material stack-up configuration 10 is presented in FIG. 1. The materials (parts) to be joined, 4a and 4b, are placed so that an edge 8a and edge 8b are juxtaposed one to the next (adjacent to each other and typically in contact with each other) to form a weld zone. An upper cover sheet 2 is placed on top of the edges 8a and 8b (the weld zone) and a lower cover sheet 6 is placed under the weld zone (8a, 8b). Rotating circular electrodes 12 and 14 travel on the outer surfaces of cover sheets 2 and 6 with current passing through cover sheets 2 and 6 and the weld zone in the region of 8a, 8b.

Standard resistance seam welding equipment typically is employed to make the joint with a number of process factors influencing the process including, but not limited to: weld current, weld force, electrode travel speed, weld schedule, power (either AC or DC), electrode geometry, part thickness, cover thickness, and part material surface condition among others.

In the following examples, a 5154 aluminum alloy was used for all weld trials. Both 0.040 in. (1.0 mm) and 0.080 in. (2.0 mm) aluminum sheet were investigated. The low carbon steel employed for the cover sheets was 0.030 in. (0.76 mm) or 0.060 in. (1.5 mm) thick. All welds were made using a National 200-kVA resistance seam welder. The electrodes utilized were standard Class II Cu with an approximate 0.300 in. (0.76 mm) face width and various face radii. Current levels were monitored using a Miyachi MM-326B weld checker. Tensile samples were tested using a 5-kip standard tensile testing machine.

The conductive heat resistance welding process of the present invention is a process that can be used for many applications such as continuously joining aluminum alloys with a butt joint configuration. The process utilizes resistance heating of one or more cover steel cover sheets 2, 6 with subsequent conductive heating of the aluminum parts 4a, 4b. Although this process is termed "conductive heat resistance seam welding", it is important to realize that this process is significantly different than standard resistance seam welding. With the conductive heat resistance seam welding process of the present invention, formation of the joint is similar to a continuous casting process. As such, this process incorporates both the fundamental aspects of heat generation through resistive heating and joint formation through casting.

Heat generation with traditional conductive resistance welding, as with all resistance welding processes, is based upon $I^2rt$ heating (I=current, r=resistance, t=time). The traditional process effects of material bulk resistance, interface resistance, material stack-up, etc. in conventional resistance seam welding are well understood. When considering the conductive heat resistance seam welding process of the present invention, many of the same process effects are present; however, their influences on the process are quite different.

With the conductive heat resistance seam welding process, heat generation is the result of resistive heating. Heat generation occurs due to the respective bulk resistances of the covers 2, 6 (e.g., steel) and material of the parts to be welded 4a, 4b (e.g., aluminum), along with all of the interface resistances. Those factors which promote resistive heating of the steel (i.e., bulk resistive heating) and decreased interface resistances (i.e., interface heating), improve the conductive heat resistance seam welding process. This is attributable to (1) the somewhat narrow temperature range between through thickness melting of the parts 4a, 4b and that which allows for the part to bond to the cover sheets 2, 6 and (2) the consistency of the applied heat. Some of the factors which influence the above include cover sheet thickness, weld force, part material surface coatings, e.g., aluminum oxide, etc.

The generation of heat in conventional resistance seam welding is based upon the reaction of current with the workpiece resistance. Formation of the joint is dependent upon achieving sufficient heating to promote melting of the parts. During this process of the present invention, constraint is provided by the welding electrodes acting under a force as it is applied to the outer surface of the cover sheets.

Figure 3B:
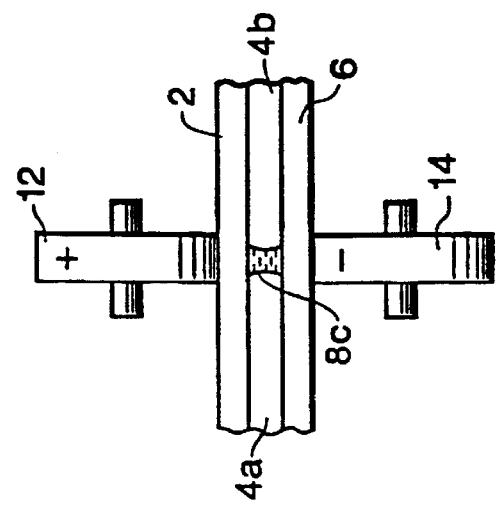
Figure 3C:
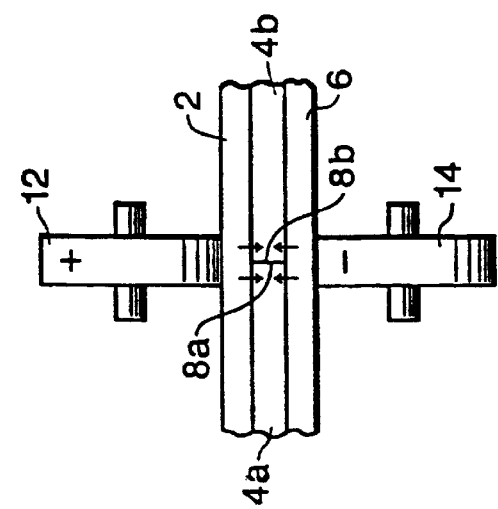
Figure 5:
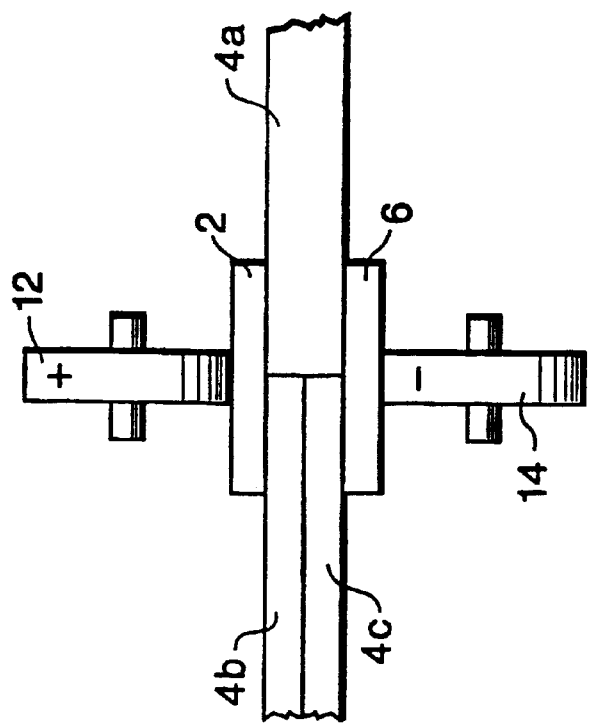
FIG. 5 is a partial schematic view illustrating a welding arrangement for producing butt joints with multiple sheets (parts) according to the conductive heat resistance seam welding method of the present invention.

As shown in FIGS. 3a–c, the formation of the joint weld with a conductive heat resistance seam welding process can be compared to a casting process. The resistive heating ($I^2rt$) produces heat conduction to the weld region 8a, 8b (FIG. 3a, arrows). As shown in FIG. 3b, the heat conduction provides the energy required for the solid to liquid transformation in the weld region 8a, 8b. The two steel cover sheets 2 and 6 along with the surrounding solid aluminum 4a and 4b comprise the die which encases the molten aluminum 8c. As shown in FIG. 3c, upon solidification, the separate sheets of aluminum become joined by weld 8d.

In all welding processes there is a range over which "acceptable" welds are achieved. Typically with conventional resistance seam welding, this range has a lower applied heat (i.e., current) level which produces a weld of adequate width and spot overlap and an upper applied heat level which results in expulsion. Similarly with the conductive heat resistance seam welding process of the present invention, there exists a lower and upper "applied heat" level. The lower level is defined as that which results in complete through thickness melting of the aluminum. The upper level is defined as that applied heat level where the molten parts bond with the cover sheet.

A number of process factors effect the conductive heat resistance seam welding process. Similar to all welding processes, these factors are not entirely free-standing, but rather, they interact with one another. As such, control of the conductive heat resistance seam welding process is a matter of balancing various aspects of the process and the process factors so as to achieve a satisfactory joint.

It is important to note that although presented here in relation to travel speed, the conditions mentioned can not be solely attributed to travel speed. Rather they are a function of balancing heat input versus heat removal. Any factor which influences heat transfer may also cause similar results.

Similar to the formation of a hermetic joint using resistance seam welding, the conductive heat resistance seam welding process involves localized melting and re-solidification of the parent material. When this occurs in an over-lapping manner, it is possible to produce a continuous joint. Continuous joints can be produced with travel speeds up to 150 in/min (380 cm/min). Achieving a desired travel speed is dependent upon balancing both heat input and constraint.

Considering the input and removal of heat, if the travel speed is too fast for an insufficient supply of heat, through thickness melting of the aluminum parts does not occur. If the supply of heat is sufficient to produce through thickness melting and the travel speed is too fast, the electrode wheels move off of the area of molten aluminum prior to solidification, resulting in cracking and other discontinuities. In contrast, if the input of heat is sufficient to produce through thickness melting and the travel speed is too slow, a number of situations are observed.

First, increases in the applied heat increase joint width. The effect of having wider joints is not completely understood; however, it appears that there are benefits to having narrower joints. Second, with too much heat, the aluminum forms a bond with the steel. When this occurs, it becomes more difficult to remove the consumable steel cover sheets and, in some instances, such removal results in removal of aluminum from the joint.

Third, with increases in the amount of heat present, heat conducts down the aluminum ahead of the seam welding wheels. Conduction of heat ahead of the wheels decreases the yield strength of the upcoming non-bonded aluminum. As such, as the electrode wheels progress forward, instead of "stepping up" onto a solid stack-up of steel and aluminum, the electrode wheels (acting through the steel cover sheets) "plow" forward into soft, formable aluminum. This separates the joint and completely prevents joint formation.

For the conductive heat resistance seam welding process, the effect of current is similar to that of any resistance welding process. The applied current is the source of energy which allows generation of heat. The optimal amount of current corresponds to production of sufficient heat to promote full thickness melting of the material to be joined, e.g., aluminum, without subsequent bonding of the aluminum to the steel cover sheets.

The effect of weld force on the conductive heat resistance seam welding process is first associated with its effect on interface resistance. High interface resistances (i.e., low weld forces) promote rapid heat generation and increased fluctuations in temperature. Such conditions decrease the ability to achieve a satisfactory joint. Second, the welding force, translated through the cover sheets, provides constraint to the weld process. In this way, higher forces allow larger welds to form.

Continuous power, along with a number of various pulsation weld schedules, can be used. The results suggest there is not a single preferential weld schedule. It is evident that for a given set of process conditions, the preferential weld schedule is that which provides sufficient weld time to allow for full thickness melting of the aluminum, and, just as importantly, allows sufficient cool time for re-solidification of the aluminum prior to loss of constraint.

With regard to the type of power utilized, satisfactory joints are achieved with both AC and DC power. The most significant difference between the two types of power is the differential heating associated with direct current. This differential heating is identical to that which exists with all DC resistance welding processes. For the conductive heat resistance seam welding process, compensation for differential heating is achieved by utilizing a thicker steel cover sheet on the upper surface (the upper surface corresponds to that which has the greater amount of heat due to the passing of the direct current).

Both flat and various radii-faced electrodes can be utilized. With flat-faced electrodes, any changes in material thickness, electrode roundness, or electrode alignment which results in a variation in pressure along the electrode contact area, also results in a variation in applied heat to the butt joint. Variation in pressure along the face allows for a preferential current path which is located at the outer edge of the electrode, away from the butt joint.

With radiused electrodes, the occurrence of improper current concentration along the butt joint is minimized. However, too small of electrode face radii results in increased separation of the butt joint. As such, the best results are obtained with large radii electrodes which focus the current towards the center of the electrode (i.e., the region of the butt joint), but minimize the stresses which promote separation of the aluminum butt joint.

Both 0.040 in (1.0 mm) and 0.080 in (2.0 mm) aluminum sheet (part) material was used. The primary difference between these two gauges was that the process factor levels for the thicker material were typically higher. With regard to weldability, both the materials showed the process characteristics which have been previously discussed.

The steel cover sheets utilized were either 0.030 (0.75 mm) or 0.060 in (1.5 mm) thick. Selection was based solely upon availability and therefore no correlations can be drawn between the gauges of aluminum and the gauges of steel utilized. When comparing the two gauges of steel, the process favors the thicker steel. This is primarily due to the thicker steel's ability to provide increased constraint. This increased constraint is beneficial when using electrodes with tighter face radii and when running at higher travel speeds.

As noted, factors which promote bulk and reduce interface heating improve the conductive heat resistance seam welding process. Unclean steel surfaces with rust, scale, and dirt, along with the presence of aluminum oxide (on the part material to be joined) all increase interface heating. As such, from a heat source aspect, they are unfavorable for producing consistent conductive heat.

Another aspect of contaminants and oxides is the effect on weld formation. Contaminants result in welds with poorer surface appearance and mechanical performance which is attributable to the process of forming the joint. As formation involves a fusion process, all of the oxides and contaminants which are present prior to melting, become entrapped in the weld upon re-solidification.

Representative joints were evaluated using a standard tensile shear test. Table 1 present the results from evaluating a single conductive heat resistance seam welding joint. The joint from which the samples of Table 1 were taken was made using 0.080 in (2.0 mm) aluminum. The process conditions included 100 in/min (254 cm/min) travel speed, 1050 lbs (4670 N) weld force, 13.0 kA weld current, and a 5-on/0-off weld schedule. Examination of the test samples showed failure occurred along the joint. Similar to electrode indentation with standard resistance seam welding, the final joint geometry for the conductive heat resistance seam welding process shows a reduction in thickness. Typically, this reduction was down to 85% of the parent sheet thickness. Partial overlap of the sheet material to be joined or use of a filler material can be used to improve the final joint geometry and mechanical performance.

TABLE 1

Sample Tensile Shear Mechanical Test Results

| Sample Number | Tensile Shear Stress |
| --- | --- |
| Base Material | 31,850 |
| Sample 1 | 18,653 |
| Sample 2 | 18,615 |
| Sample 3 | 11,746 |
| Sample 4 | 20,423 |
| Sample 5 | 16,620 |
| Average of Samples | 17,211 |

Figure 4:
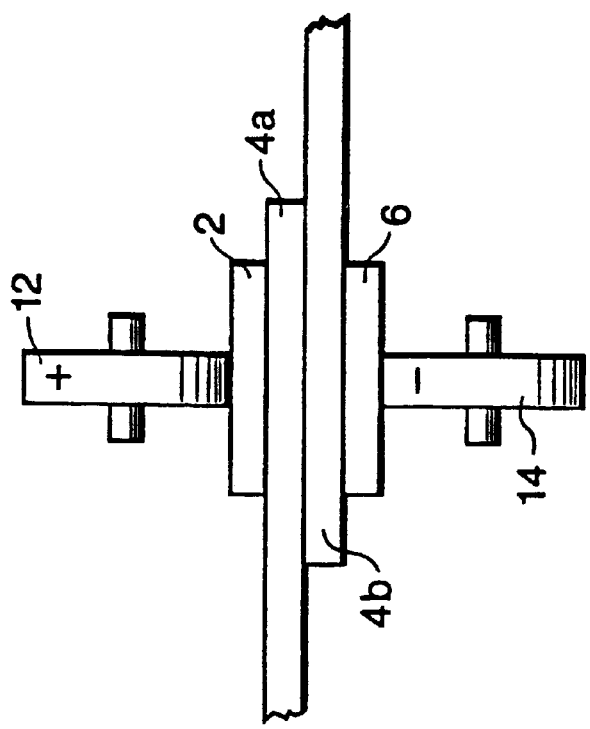
FIG. 4 is a partial schematic view illustrating a welding arrangement for producing lap joints according to the conductive heat resistance seam welding method of the present invention.
Figure 7:
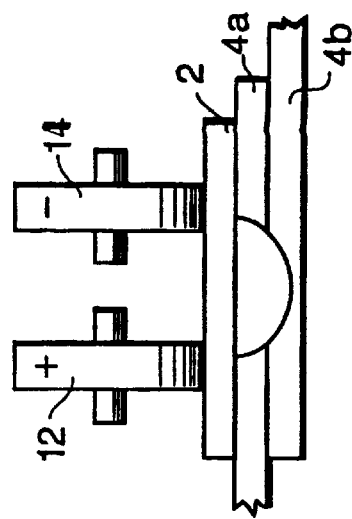
FIG. 7 is a partial schematic view illustrating a welding arrangement for producing lap joints using a pair of electrodes contacting a single cover sheet and the conductive heat resistance seam welding method of the present invention.

The conductive heat resistance seam welding process is also adaptable to a range of weld configurations as shown in FIGS. 4–8. FIG. 4 refers to a lap joint configuration. In this configuration, the parts (sheets) 4a, 4b are lapped a distance substantially greater than the width of the weld zone itself. Cover sheets 2, 6 are then provided on both the top and bottom surfaces and joined in the manner described above for butt welds. In this case, melting extends from the cover sheets 2, 6, lapping at the center and effecting the joint (weld). Parts (sheets) 4a, 4b can be of dissimilar thickness with differences in cover sheet thicknesses effecting the proper heat balance. As shown in FIG. 7, if the parts 4a, 4b are thick enough, it is also possible to accomplish joining from only one side; that is, using only a single cover sheet 2. In this case, the melt zone extends only from a single side effecting the joint as it crosses the bond line. A multiple sheet configuration is presented in FIG. 5. In this case, two thinner sheets 4b, 4c are attached (in a butt configuration) to a thicker sheet 4a. This approach can be done in either butt or lap configurations. For this application, two (top and bottom) cover sheets 2, 6 are used.

Figure 6:
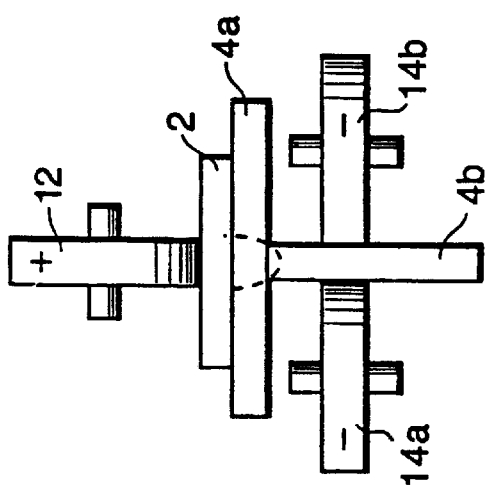
FIG. 6 is a partial schematic view illustrating a welding arrangement for producing tee-section joints according to the conductive heat resistance seam welding method of the present invention.

Another configuration, for joining tee sections, is shown in FIG. 6. For the tee configuration, a single cover sheet 2 is used to create and constrain the molten pool on the base component part 4a. Various means of conducting current into the attached component part 4b such as a pair of circular rolling electrodes 14a, 14b can be used to complete the electrical circuit. Melting occurs on the back side of 4a and extends into the attached part 4b to effect the joint.

Figure 8:
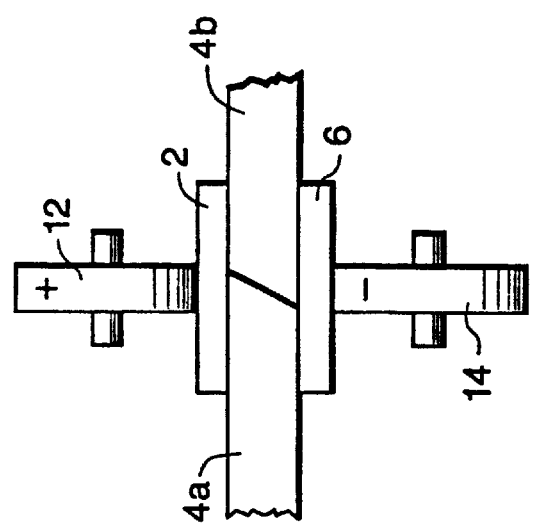
FIG. 8 is a partial schematic view illustrating a welding arrangement for producing mash joints according to the conductive heat resistance seam welding method of the present invention.

FIG. 8 shows a mash-type joint. In this case, the sheets (parts 4a, 4b) to be joined are lapped slightly and mechanically pre-mashed to form an angled weld zone with very tight fit-up. This is done to create a joint area with slightly more metal volume for welding. Joining is done in a manner consistent with the butt welds described previously.

It is possible that changes in configurations to other than those shown could be used but that which is shown if preferred and typical. Without departing from the spirit of this invention, various other arrangements of parts to be welded, covers, and electrodes may be used. It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention.

We claim:

1. A welding arrangement comprising:
   a) a first part;
   b) a second part;
   c) a portion of said first part and a portion of said second part juxtaposed one to the next to form a weld zone;
   d) resistively heated and electrically-conductive sheet material, said sheet material consisting of a single sheet, said single sheet:
      1) having a higher melting temperature than a melting temperature of said first part and a melting temperature of said second part,
      2) placed on a first side of said weld zone, and
      3) conductively heating said weld zone to weld said first part and said second part together;
   e) a first electrode placed in contact with said single sheet;
   f) a second electrode positioned and aligned with said first electrode to heat resistively said single sheet with an electrical current with subsequent conductive heating of said weld zone to produce sufficient heat to weld said first part and said second part together.

2. The welding arrangement of claim 1 wherein said first part and said second part are of substantially the same material composition.

3. The welding arrangement of claim 2 wherein said material composition is substantially an aluminum composition.

4. The welding arrangement of claim 1 wherein said single sheet is substantially a steel composition.

5. The welding arrangement of claim 1 wherein said portion of said first part and said portion of said second part are juxtaposed to form a butt joint.

6. The welding arrangement of claim 1 wherein said first edge of said first part and said second edge of said second part are juxtaposed to form a lap joint.

7. The welding arrangement of claim 1 wherein said portion of said first part and said portion of said second part are juxtaposed to form a tee joint.

8. The welding arrangement of claim 1 wherein said electrodes are rotating, circular electrodes.

9. A welding method comprising:
   a) providing a pair of electrodes;
   b) placing a portion of a first part and a portion of a second part next to each other to form a weld zone;
   c) providing electrically-conducting and resistively heated sheet material, said sheet material consisting of a single cover sheet placed between one of said electrodes and said weld zone;
   d) resistively heating said cover sheet by passing a current between said electrodes;
   e) conductively heating said first part and said second part in said weld zone to form a melt of said first part and said second part in said weld zone;
   e) constraining said melt in said weld zone with said single, electrically-conducting cover sheet; and
   f) cooling said melt to join said parts.

10. The method according to claim 9, wherein said resistively heated sheet is of substantially steel composition and said first part and said second part are of substantially aluminum composition.

11. The method according to claim 9, wherein said electrodes of said pair of electrodes are rolling electrodes.

* * * * *

UNITED STATES PATENT AND TRADEMARK OFFICE
CERTIFICATE OF CORRECTION

PATENT NO. : 6,281,467 B1
DATED : August 28, 2001
INVENTOR(S) : Gould et al.

It is certified that error appears in the above-identified patent and that said Letters Patent is hereby corrected as shown below:

<u>Column 1</u>,
Line 30, "wed." should be -- weld. -- .
Line 56, "sheets)" should be -- sheet(s) -- .

Signed and Sealed this

Twenty-sixth Day of March, 2002

Attest:

JAMES E. ROGAN
*Attesting Officer*  *Director of the United States Patent and Trademark Office*